United States Patent
Wise, Jr. et al.

(10) Patent No.: US 9,291,262 B2
(45) Date of Patent: Mar. 22, 2016

(54) SHIFT INTERLOCK FOR A TRANSMISSION

(71) Applicant: DEERE & COMPANY, Moline, IL (US)

(72) Inventors: Cecil H. Wise, Jr., Coffeyville, KS (US); Garth Mindermann, Minneapolis, MN (US)

(73) Assignee: Deere & Company, Moline, IL (US)

( * ) Notice: Subject to any disclaimer, the term of this patent is extended or adjusted under 35 U.S.C. 154(b) by 79 days.

(21) Appl. No.: 14/196,810

(22) Filed: Mar. 4, 2014

(65) Prior Publication Data

US 2015/0252898 A1    Sep. 10, 2015

(51) Int. Cl.
*F16H 63/36* (2006.01)

(52) U.S. Cl.
CPC ............. *F16H 63/36* (2013.01); *Y10T 74/2011* (2015.01)

(58) Field of Classification Search
CPC ................................. F16H 63/36; F16H 61/24
USPC ............... 74/473.24, 473.25, 473.26, 473.27, 74/473.28, 473.35, 473.36, 473.37
See application file for complete search history.

(56) References Cited

U.S. PATENT DOCUMENTS

| | | | | |
|---|---|---|---|---|
| 2,962,914 A * | 12/1960 | Peras | ...................... | F16H 63/32 74/473.26 |
| 3,015,968 A | 1/1962 | Szekely | | |
| 4,070,914 A * | 1/1978 | Reinhardt | ................ | F16D 15/00 60/494 |
| 4,170,273 A * | 10/1979 | Kodama | ................ | B60K 17/344 180/233 |
| 4,356,879 A * | 11/1982 | Uchiyama | ............ | B60K 17/344 180/247 |
| 4,625,577 A * | 12/1986 | Ashikawa | ............. | F16H 63/302 74/473.25 |
| 4,651,848 A * | 3/1987 | Kobayashi | ........... | B60K 17/344 180/247 |
| 4,714,128 A * | 12/1987 | Yoshinaka | ......... | B60K 17/3467 180/247 |
| 4,920,815 A | 5/1990 | Reynolds | | |
| 5,052,245 A * | 10/1991 | Kigoshi | ............. | B60K 23/0808 180/247 |
| 5,544,541 A | 8/1996 | Kruizenga et al. | | |
| 5,816,101 A * | 10/1998 | Weston | ................. | F16H 3/0915 74/331 |
| 5,893,293 A | 4/1999 | Earp | | |
| 5,950,492 A * | 9/1999 | Crawford | ................ | F16H 63/32 192/48.91 |
| 6,026,698 A * | 2/2000 | Weston | ................. | F16H 3/0915 74/335 |

(Continued)

FOREIGN PATENT DOCUMENTS

| | | |
|---|---|---|
| DE | 1163688 | 2/1964 |
| DE | 8122318 | 12/1981 |
| DE | 102004031321 | 1/2006 |

OTHER PUBLICATIONS

Search Report for related German patent application No. DE 102015203488.7, Mar. 20, 2015.

(Continued)

*Primary Examiner* — William Kelleher
*Assistant Examiner* — Leonard J Archuleta
(74) *Attorney, Agent, or Firm* — Ingrassia, Fisher & Lorenz PC (57) ABSTRACT

A transmission interlock assembly is described. A shift rail may include an interlock passage containing at least one interlock member. First and second gear engagement devices mounted to the shift rail may include, respectively, first and second interlock indents. The interlock member may extend into the first or the second interlock indent when, respectively, the first or the second gear engagement device is in neutral. With both gear engagement devices in neutral, as the first (or second) gear engagement device is moved to engage a gear, the interlock member may be urged out of the first (or second) indent and into the second (or first) indent, the interlock member thereby preventing the second (or first) gear engagement device from moving out of neutral.

13 Claims, 8 Drawing Sheets

(56) References Cited

U.S. PATENT DOCUMENTS

| | | | |
|---|---|---|---|
| 6,026,702 A | 2/2000 | Dreier et al. | |
| 6,691,590 B1 | 2/2004 | Patzner et al. | |
| 2003/0019710 A1* | 1/2003 | Brandwitte | F16H 63/206 192/70.22 |
| 2004/0221677 A1 | 11/2004 | Beer et al. | |
| 2005/0284131 A1 | 12/2005 | Forthmann et al. | |
| 2011/0061487 A1 | 3/2011 | Tooman et al. | |
| 2012/0247255 A1* | 10/2012 | Fritschle | F16H 63/20 74/473.25 |

OTHER PUBLICATIONS

Single Shaft Shifting EWS, http://www.gif.net/en/developments/ews/, Admitted Prior Art.

Range Transmission, http://tractorz.blogspot.in/2012/07/range-transmission.html, Admitted Prior Art.

* cited by examiner

SHIFT INTERLOCK FOR A TRANSMISSION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to the shifting between gears in a vehicle or other transmission, including prevention of the engagement of multiple gears through an interlock mechanism.

BACKGROUND OF THE DISCLOSURE

In various vehicle and non-vehicle platforms, a power source such as an engine may provide power to a transmission. An operator, an automated system, or another mechanism may select a particular gear ratio within the transmission, in order to convert the power from the power source to an appropriate torque or speed for a particular operation of the platform. For example, a shift fork or other gear engagement device may be used to engage a particular gear, which may provide a particular gear ratio for transfer of power through the transmission.

In certain embodiments, various gears for various gear ratios may be located along a single shaft within a transmission. This may be useful, for example, in order to minimize the space required for a given transmission with a particular set of gears. In this and other configurations, it may sometimes be possible for an operator (or other mechanism) to accidentally engage (or try to engage) more than one gear at a time. Because this may increase the potential for wear or other damage, or other undesirable effects, it may be useful to provide a mechanism that prevents selection (or attempted selection) of one gear while another gear is still engaged.

SUMMARY OF THE DISCLOSURE

A shift interlock is disclosed for preventing the simultaneous engagement of different gears by two or more gear engagement devices.

According to one aspect of the disclosure, a transmission may be provided, the transmission being configured to shift between at least neutral, a first gear, and a second gear. A shift interlock assembly for the transmission may include a shift rail with at least one interlock passage extending through the shift rail. First and second gear engagement devices may be mounted to the shift rail and may be moveable along the shift rail to engage, respectively, the first and the second gears. The first and second gear engagement devices may include, respectively, first and second interlock portions having, respectively, first and second indents.

An interlock member contained, at least in part, within the at least one interlock passage may extend into the first or the second indent when, respectively, the first or the second gear engagement device is in neutral. As the first gear engagement device moves along the shift rail from neutral to engage the first gear, the first interlock portion may urge the interlock member out of the first indent and into the second indent, thereby preventing the second gear engagement device from moving out of neutral. As the second gear engagement device moves along the shift rail from neutral to engage the second gear, the second interlock portion may urge the interlock member out of the second indent and into the first indent, thereby preventing the first gear engagement device from moving out of neutral.

In certain embodiments, as the first gear engagement device moves to neutral from engagement with the first gear, the first indent may realign with the at least one interlock passage, the interlock member being thereby permitted to move into the first indent and out of the second indent. As the second gear engagement device moves to neutral from engagement with the second gear, the second indent may realign with the at least one interlock passage, the interlock member being thereby permitted to move into the second indent and out of the first indent.

In certain embodiments, a first or second end of the interlock member may be biased toward, respectively, the first or the second gear engagement device. The interlock member may include a pin or a spherical interlock member. The at least one interlock passage may include a cylindrical passage extending through a centerline of the shift rail.

In certain embodiments, the first and second gear engagement devices may include first and second shift forks slidably attached to the shift rail. The first or second interlock portion may include a partial cylinder, such as a half-cylinder, partially surrounding the shift rail. The first and second interlock portions may overlap each other, at least in part, along the shift rail.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed shift interlock system, as shown in the accompanying figures of the drawings described briefly above. Various modifications to the example embodiments may be contemplated by one of skill in the art.

As noted above, it may be useful to provide a mechanism that prevents an operator (or other mechanism) from engaging more than one gear ratio at the same time for a particular transmission. In various embodiments, the disclosed shift interlock assembly may be useful for this purpose (and others).

In certain embodiments, two gear engagement devices (e.g., two shift forks) for a particular transmission may be mounted to a single shift rail. A shift selector may engage the engagement devices such that the shift selector may cause one or more of the engagement devices to select a particular gear. For example, the shift selector may be moved in one direction to selectively engage a particular one of the engagement devices, then moved in another direction to cause the selected engagement device to engage (or disengage) a particular gear. In this way, by moving the shift selector (e.g., via a shift lever, electronic actuator, or otherwise) an operator or other mechanism may cause a particular engagement device to select (i.e., engage) a particular gear, and thereby provide a particular gear ratio for the flow of power through the transmission. In such a configuration, for example, an operator may select a gear by way of an H-pattern shift lever, the lever moving the shift selector, the shift selector moving a particular engagement device, and the engagement device causing a particular gear to engage.

In certain embodiments, as part of a shift interlock assembly for various engagement devices, at least one interlock passage (e.g., a cylindrical bore) may be provided though the shift rail to which the engagement devices are mounted. An interlock portion of each engagement device may extend over this passage, with the interlock portion of one engagement device covering an opening of the passage on one side of the shift rail and the interlock portion of the other engagement device covering an opening of the passage on the other side of the shift rail. Interlock indents may be provided on the respective interlock portions of the engagement devices, with each indent being configured to align with the interlock passage when the associated engagement device is in neutral (i.e., when the associated engagement device is not engaging any gear). (As used herein, "indent" may include indentations or other openings of various geometries or configurations, as well as bores or other passages extending partly or entirely through a relevant body.) An interlock member (e.g., a single-piece interlock pin or a spring-loaded set of spherical interlock balls) may be seated within the bore, with the interlock member extending out of the bore on either side at its maximum extension.

In this way, for example, when both engagement devices are in neutral (e.g., when the transmission itself is entirely in neutral, or when a gear ratio associated with a different shift rail has been selected), the interlock member may partially extend into each of the interlock indents, the opposite ends of the interlock member thereby partially interfering with (but not entirely preventing) movement of the engagement devices along the shift rail. When a first of the engagement devices is then moved along the shift rail from this neutral position (i.e., to engage a particular gear), the interlock indent of the first engagement device may be correspondingly moved out of alignment with the interlock passage. This may cause the interlock portion of the first engagement device to urge the interlock member into one end of the interlock passage and, correspondingly, to urge the interlock member out of the other end of the interlock passage. Because the interlock indent of a second engagement device may still be aligned with the bore (i.e., because the second engagement device is in neutral), the interlock member may thereby be urged further into the interlock indent of the second engagement device. This may accordingly prevent the second engagement device from moving (e.g., as may be necessary to for the second device to engage a different gear) so long as the currently engaged engagement device is out of neutral. When the first gear engagement device is shifted back to neutral, however, this may realign the interlock indent of the first engagement device with the interlock passage, thereby allowing the interlock member to move back into the first interlock indent. Either engagement device may then be moved along the shift rail to engage a gear.

Figure 1:
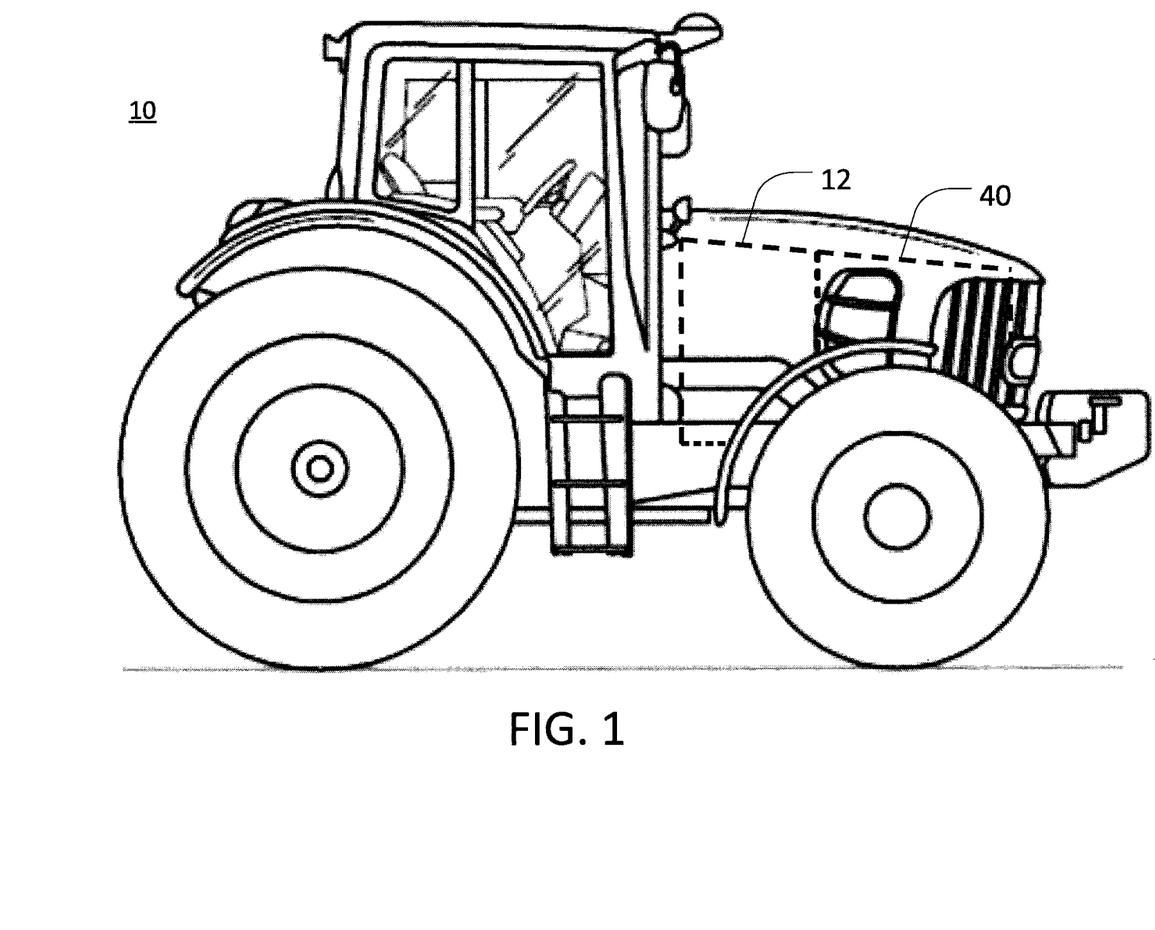
FIG. 1 is a schematic view of an example work vehicle having a transmission in which a shift interlock may be implemented.

As noted above, a shift interlock assembly may be usefully implemented with respect to various powered platforms, including both vehicle and non-vehicle platforms. Referring now to FIG. 1, for example, example vehicle 10 may be provided. As depicted in FIG. 1, vehicle 10 may be an agricultural vehicle such as a tractor, although it will be understood that various other configurations may be possible. Vehicle 10 (or another platform) may include transmission 12, which may receive power from a power source such as internal combustion engine 40.

Figure 2:
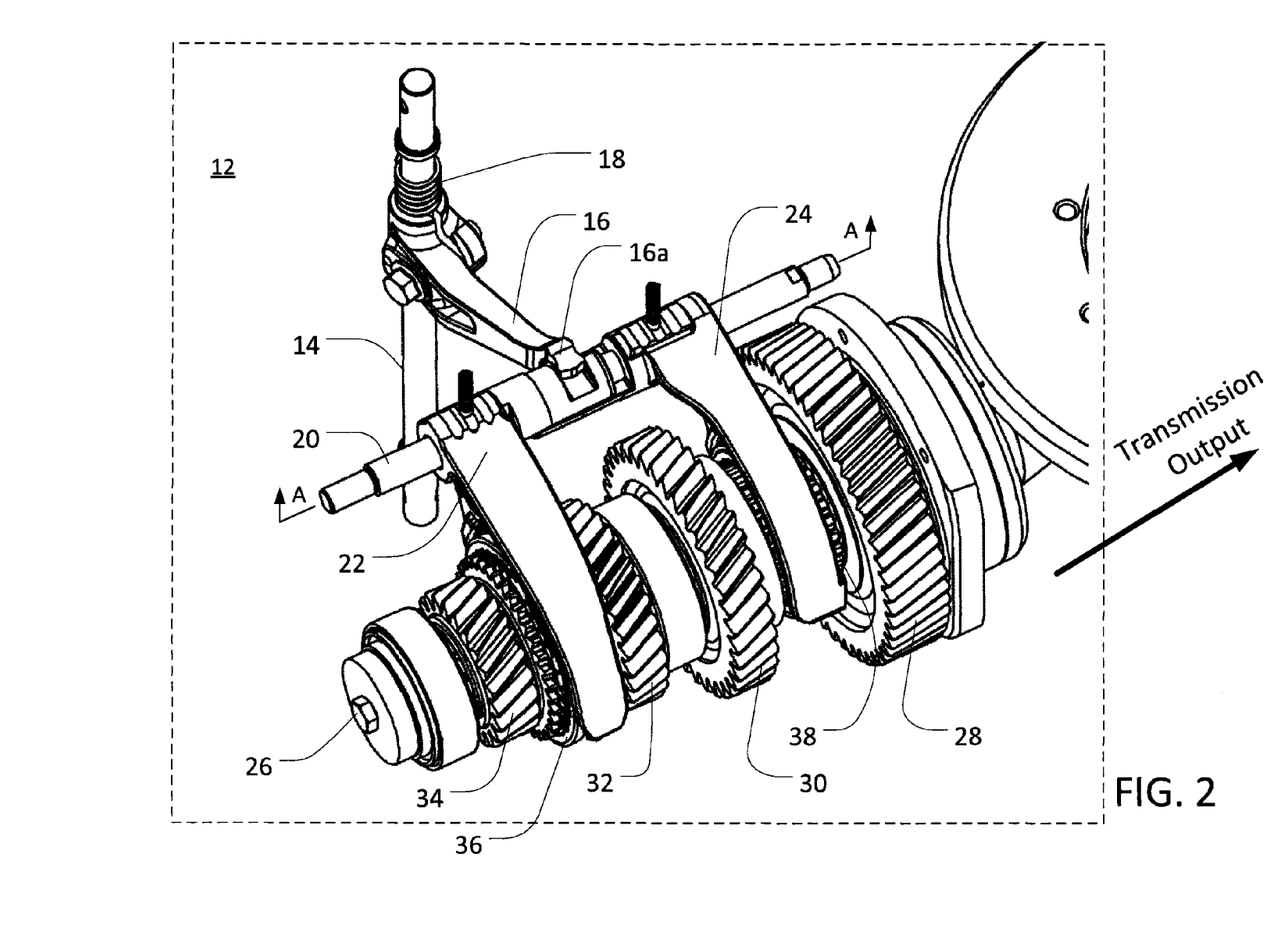
FIG. 2 is a perspective view of certain components of the transmission of the example work vehicle of FIG. 1, including an example shift interlock assembly.
Figure 3:
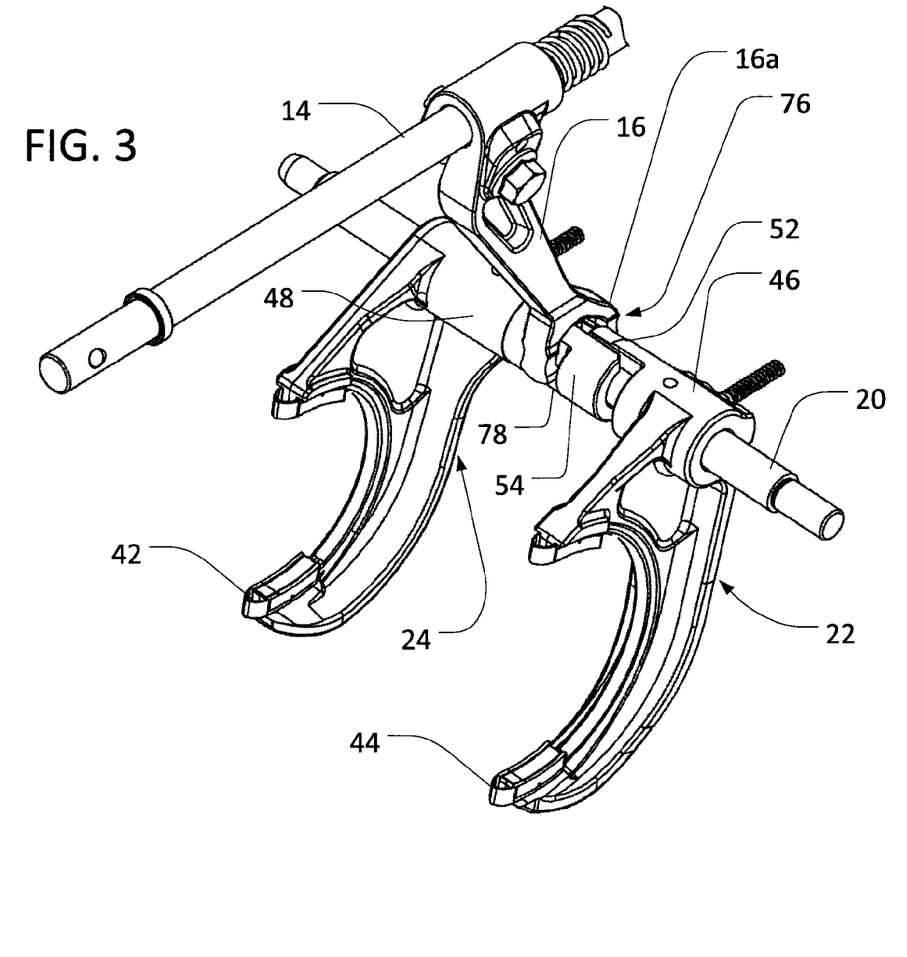
FIG. 3 is a perspective view of the shift interlock assembly and other transmission components of FIG. 2.

Referring also to FIGS. 2 and 3, transmission 12 may include selector rail 14, which may be coupled to a gear selector lever or other mechanism (not shown) of vehicle 10. For example, selector rail 14 may be coupled to an H-pattern shift lever in the cab of vehicle 10, such that an operator may manually engage the shift lever to cause, via selector rail 14, selection of a particular gear ratio for transmission 12. Shift selector 16, which may include selector fork 16a, may be mounted to selector rail 14 in various known ways (e.g., via a pinned connection, a woodruff key, and so on). In certain embodiments, spring 18 or other biasing element may be provide for selector rail 14 or shift selector 16, in order to bias shift selector 16 toward a particular orientation when it is not actively engaged.

Shift rail 20 with centerline 20a (see FIG. 4) may be provided, to which various gear engagement devices, such as shift forks 22 and 24, may be mounted. (Discussion below may present various examples including shift forks 22 and 24. It will be understood, however, that various discussion below may also apply to other gear engagement devices.) Shift forks 22 and 24 (or other gear engagement devices) may be slidably (or otherwise) mounted to shift rail 20 such that shift forks 22 and 24 may be selectively slid (or otherwise moved) along shift rail 20 by shift selector 16. For example, through operator input (or otherwise) shift selector 16 may be moved up or down (from the perspective of FIG. 2) such that selector fork 16a engages with one of shift forks 22 and 24 at, respectively, one of engagement recesses 76 and 78. Shift selector 16 may then be rotated to either side in order to move the selected shift fork 22 or 24 axially along rail 20 and thereby engage a particular gear.

A shift fork may select a particular gear in various known ways. As depicted in FIG. 2, for example, gear shaft 26 may include A-gear 28, B-gear 30, C-gear 32, and D-gear 34, each of which may rotate freely around shaft 26 as driven by an input (or other) shaft (not shown). Gears 28, 30, 32 and 34 may operate as range gears, speed gears, or any variety of other gear types, with respect to transmission 12 or vehicle 10. A shift collar (e.g., shift collar 36) may be held by each shift fork 22 and 24 (e.g., by way of shifter clips 42 and 44), with the shift collar configured to slide along a splined interface on shaft 26 (e.g., splined interface 38) in order to engage one of gears 28, 30, 32, or 34. A shift collar (e.g., shift collar 36) may engage a particular gear in various known ways, including through a synchronizer ring, a dog collar mechanism, or various other known devices. Accordingly, for example, when shift selector 16 causes shift fork 22 to slide to the left along shift rail 20 (from the perspective of FIG. 2), shift collar 36 may also be moved to the left to engage D-gear 34, causing the rotational power of gear 34 (e.g., as driven by the transmission input shaft (not shown)) to be transmitted through shift collar 36 and the associated splined connection (not shown) to shaft 26 and the transmission output.

With one shift fork engaging a particular gear of transmission 12, if another shift fork were to simultaneously move out of neutral, this could cause wear or other damage to the transmission or otherwise detrimentally affect the performance of vehicle 10 (e.g., by stalling engine 40). For example, while shift fork 22 has engaged D-gear 34, if shift fork 24 were also to slide to the left on shift rail 20 (from the perspective of FIG. 2) to engage B-gear 30, the difference in gear ratios between D-gear 34 and B-gear 30 may result in excessive wear on the various associated shift collars, other shifting elements, or gears 30 and 34 themselves, or may result in other detrimental effects (e.g., stalling of engine 40). Accordingly, as also noted above, it may be useful to provide an interlock assembly to prevent simultaneous engagement of gears by both of shift forks 22 and 24.

Figure 4:
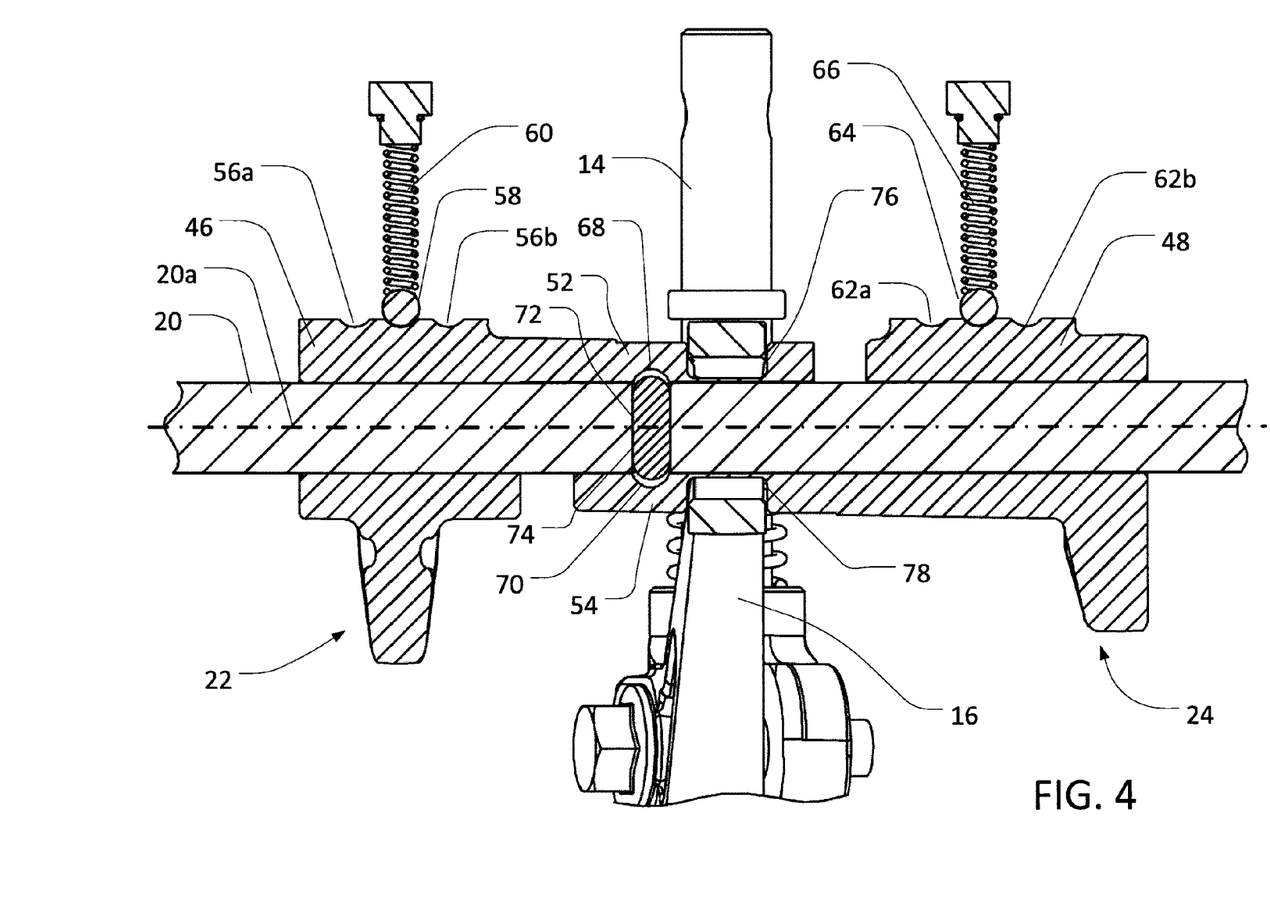
FIG. 4 is a sectional view of the shift interlock assembly of FIG. 2, taken along plane A-A of FIG. 2.

Referring also to FIGS. 4-7, various features may be included. In certain embodiments, in order to assist an operator in determining the appropriate neutral and engaged locations for shift forks 22 and 24, various feedback mechanisms may be provided. For example, shift fork 22 may include gear-selector indents 56 configured to receive gear-selector ball 58, which may be fixed relative to shift rail 20 and may be biased toward shift fork 22 by spring 60. In this way, for example, when shift fork 22 slides to the left (as depicted in FIG. 4) to engage D-gear 34, gear-selector ball 58 may be seated into gear-selector indent 56a, thereby providing additional feedback to an operator that D-gear 34 has been (and is) appropriately engaged. Likewise, shift fork 24 may include gear-selector indents 62 configured to receive gear-selector ball 64, which may be fixed relative to shift rail 20 and may be biased toward shift fork 24 by spring 66. In this way, for example, when shift fork 22 slides to the right (as depicted in FIG. 4) to engage A-gear 28, gear-selector ball 64 may be seated into gear-selector indent 62b, thereby providing additional feedback to an operator that A-gear 28 has been (and is) appropriately engaged.

Still referring to FIGS. 4-7, in order to provide interlock functionality, shift forks 22 and 24 may include, respectively, interlock portions 52 and 54. As depicted in the various figures, shift forks 22 and 24 may be configured with cylindrical mounting portions 46 and 48, respectively, which may generally surround portions of shift rail 20 in order to slidably mount shift forks 22 and 24 to shift rail 20. In such a configuration, interlock portions 52 and 54 may include partial cylinders extending away from mounting portions 46 and 48 along overlapping portions of shift rail 20. Other configurations may also be possible, including various non-cylindrical configurations of mounting portions 46 and 48, interlock portions 52 and 54, or other portions of other gear engagement devices.

Continuing, interlock passage 72 may be provided through shift rail 20. Passage 72, for example, may be configured as a cylindrical (or other) bore extending through shift rail 20. In certain embodiments, interlock passage 72 may extend diametrically through centerline 20a of shift rail 20. Interlock member 74 (e.g., an interlock pin) may be inserted into interlock passage 72 (e.g., during assembly of transmission 12). Interlock member 74 may be configured to include one or more pieces, as discussed in greater detail below. In certain configurations, interlock member 74 may extend, at its maximum extension, over a distance that is somewhat longer than the length of interlock passage 72 (e.g., the length of the diameter of shift rail 20).

Interlock portions 52 and 54 of shift forks 22 and 24 may include, respectively, interlock indents 68 and 70. Indents 68 and 70 may be configured such that when shift forks 22 and 24, respectively, are in a neutral state (i.e., are not engaged with any gear), indents 68 and 70 align with opposite ends of interlock passage 72. In this way, for example, when both of shift forks 22 and 24 are in neutral, interlock member 74 may extend out of either end of interlock passage 72 and into interlock indents 68 and 70. The dimensions of interlock indents 68 and 70, interlock passage 72 and interlock member 74 may be selected, however, such that when both shift forks 22 and 24 are in neutral interlock member 74 does not extend fully into both of indents 68 and 70 at the same time. In this way, when both of shift forks 22 and 24 are in neutral, interlock member 74 may provide some resistance to movement of either of shift fork 22 or 24 along shift rail 20, but may not entirely prevent such movement.

Figure 8:
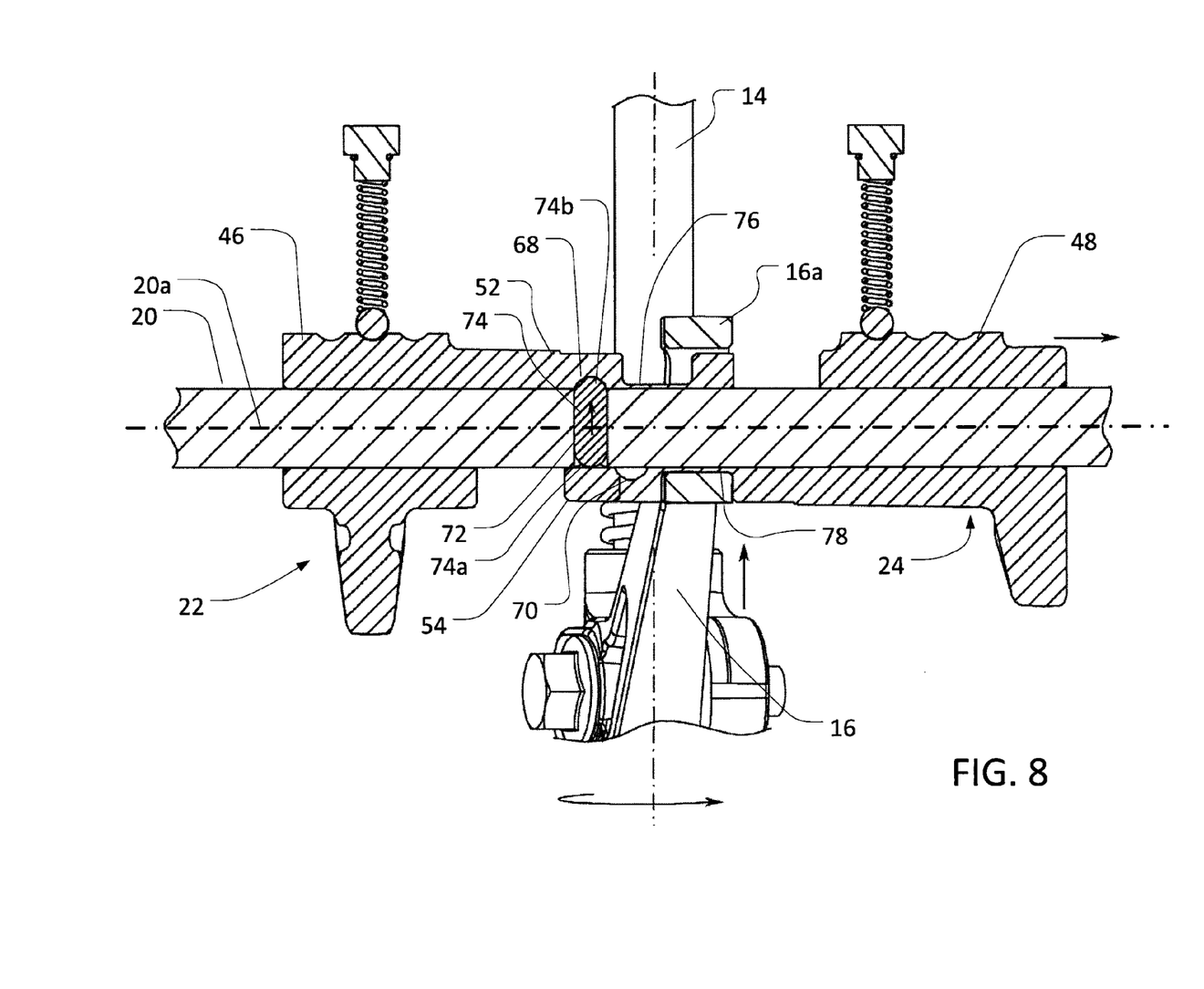
FIG. 8 is a sectional view of the shift interlock assembly of FIG. 2, taken along plane A-A of FIG. 2, with the shift interlock assembly engaged to prevent movement of a gear engagement device.

Referring also to FIG. 8, as shift fork 24 is moved from neutral to engage a gear (to the right in FIG. 8), interlock indent 70 may be moved out of alignment with interlock passage 72. As this occurs, the inner surface of interlock portion 54 (i.e., the surface of interlock portion 54 that is proximate shift rail 20 and includes interlock indent 70) may accordingly urge interlock member 74 out of indent 70 and toward interlock portion 52 of shift fork 22. This may result, for example, because the inner surface of interlock portion 54 may move across the opening of passage 72 in close proximity to shift rail 20, so there may be little (or no) space for end 74a of interlock member 74 to extend out of interlock passage 72 toward shift fork 24.

Continuing, because interlock indent 68 may still be aligned with interlock passage 72 (i.e., because shift fork 22 may still be in neutral), end 74b of interlock member 74 may be urged deeper into interlock indent 68, while end 74a of member 74 may remain within interlock passage 72 (near shift fork 24). In this way, so long as shift fork 24 remains out of neutral, interlock portion 54 (of shift fork 24) may prevent end 74a of interlock member 74 from moving out of interlock passage 72. This, in turn, may prevent end 74b of interlock member 74 from moving out of interlock indent 68 (of shift fork 22) and thereby prevent shift fork 22 from moving out of neutral. As such, the disclosed interlock assembly (in various configurations) may prevent one shift fork from moving out of neutral when another is engaged with (or moving to or from engagement with) a gear.

Further, the disclosed interlock assembly may also prevent both shift forks 22 and 24 from simultaneously moving out of neutral, even if neither of the shift forks have fully engaged a gear. For example, with both of shift forks 22 and 24 in neutral, the interoperation of interlock portions 52 and 54, interlock indents 68 and 70, interlock passage 72 and interlock member 74 (e.g., as described above) may prevent both of forks 22 and 24 from moving simultaneously out of neutral. In certain instances, for example, an attempt may be made to move both of shift forks 22 and 24 out of neutral simultaneously. For example, selector fork 16a may not properly select only one of shift forks 22 and 24 (e.g., may not fully clear either of engagement recesses 76 and 78) before attempting to move the shift forks to engage a gear. In this and other cases, the interference between interlock member 74, interlock passage 72, and interlock indents 68 and 70 may prevent either of shift forks 22 and 24 from moving simultaneously out of neutral. For example, as both shift forks begin to move simultaneously away from neutral, both of interlock indents 68 and 70 may begin to move simultaneously out of alignment with interlock passage 72. As a result, interlock portions 52 and 54 may both begin to urge ends 74a and 74b, respectively, of interlock member 74 into interlock passage 72. However, with interlock member 74 appropriately configured (e.g., as a single-piece interlock member 74, or as a multi-piece interlock member 74 with an appropriately strong biasing element), interlock member 74 may resist this urging and ends 74a and 74b of interlock member 74 may remain within interlock indents 68 and 70. This may, accordingly, prevent further movement of both of shift forks 22 and 24 away from (and out of) neutral.

As depicted in the various figures, interlock indents 68 and 70 may be configured as rounded grooves extending over a circumferential portion of the inner surfaces of, respectively, interlock portions 52 and 54 (i.e., the surfaces of interlock portions 52 and 54 proximate to shift rail 20). The inner radii of the rounded grooves of such a configuration may correspond, for example, to the end radii of interlock member 74, such that interlock member 74 may seat firmly in indent 68 or 70 when shift fork 24 or 22, respectively, moves out of neutral. Further, a curved side wall on interlock indent 68 or 70 (as depicted in the various figures), including when employed in combination with a interlock member 74 with rounded ends 74a and 74b (as depicted in the various figures), may contribute to smoother operation of the interlock assembly. For example, as shift fork 24 moves out of neutral, a curved side wall of interlock indent 70 may move smoothly along a curved ends 74a of interlock member 74 in order to smoothly urge interlock member 74 deeper into interlock indent 68 (and thereby prevent shift fork 22 from simultaneously moving out of neutral).

Other configurations may also be possible. For example, one or more of indents 68 or 70 may be configured as a constant-radius cylindrical bore into the interlock portion 52 or 54, as a cylindrical bore with a countersunk portion, as a squared bore or groove, as a triangular groove, or otherwise. Similarly, interlock member 74 may be configured with rounded, squared, pyramidal, or other types of ends 74a or 74b (or other portions).

Figure 5:
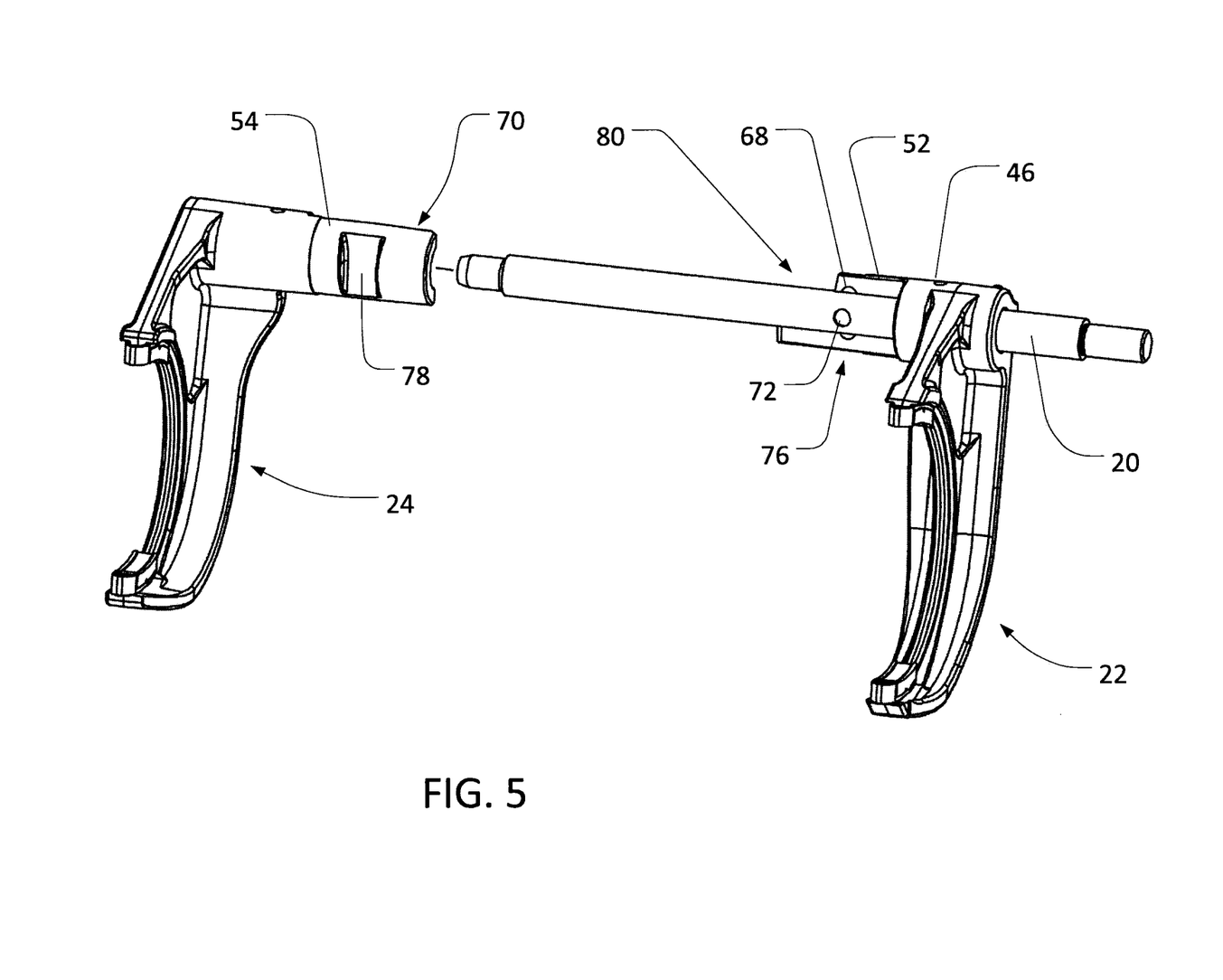
FIG. 5 is another perspective view of the shift interlock assembly of FIG. 2.
Figure 6:
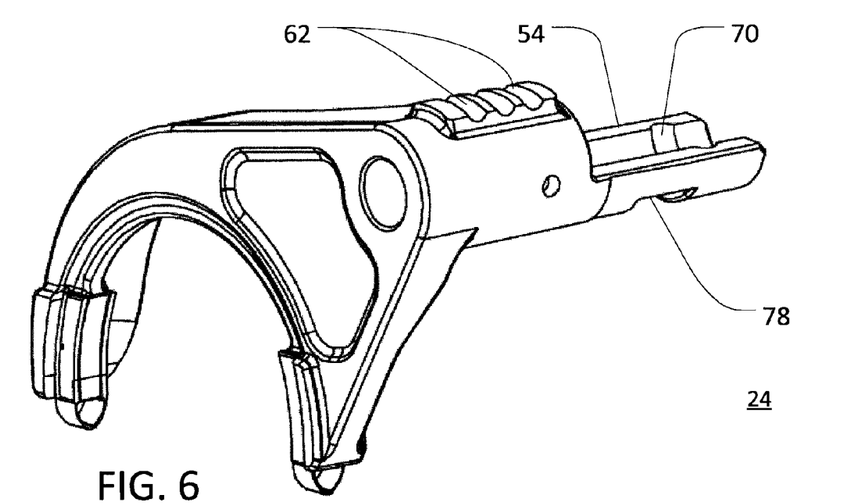
FIGS. 6 and 7 are perspective views of shift forks included in the shift assembly of FIG. 2.
Figure 7:
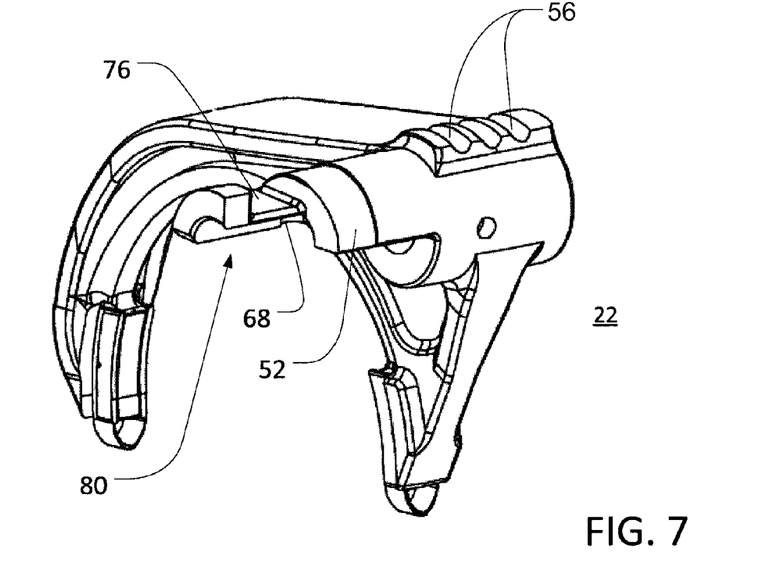

Various other features may additionally (or alternatively) be included. Referring in particular to FIGS. 4, 5 and 7, for example, it can be seen that interlock passage 72 may be disposed somewhat closer to the main portion of shift fork 22 than to the main portion of shift fork 24. This may, for example, allow interlock passage 72 to be disposed to the side of selector fork 16a when shift forks 22 and 24 are in neutral. In such a configuration, in order to facilitate easier assembly, among other benefits, end portion 80 of interlock portion 52 may be configured to cover a smaller portion of shift rail 20 than other areas of interlock portion 52. For example, with interlock portion 54 and part of interlock portion 52 configured as half-cylinder extensions of shift forks 24 and 22, end portion 80 of interlock portion 52 may be configured as a quarter-cylinder (or other partial-cylinder) extension. As can be seen in detail in FIG. 7, for example, end portion 80 may extend across all (or a portion) of engagement recess 76. In this way, for example, the quarter-cylinder (or other) configuration of end portion 80 may provide additional clearance for selector fork 16a, which may allow for easier installation of the various components within transmission 12.

Figure 9:
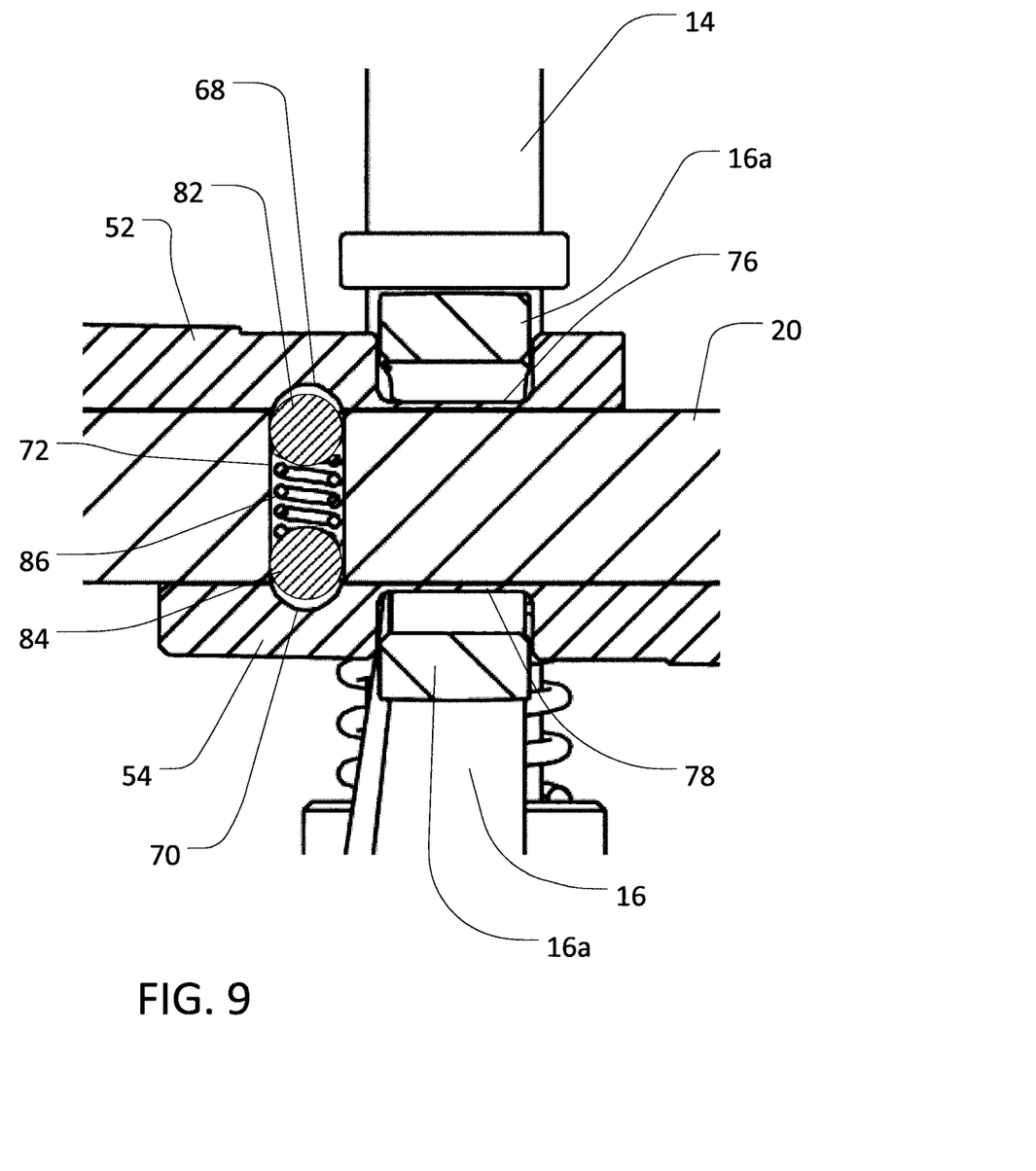
FIG. 9 is an enlarged sectional view of another configuration of the shift interlock assembly of FIG. 2, taken from a similar perspective as FIG. 4.

Referring also to FIG. 9, and as also noted above, interlock member 74 may be configured in various ways. For example, as depicted in FIGS. 4 and 8, interlock member 74 may be formed as a single-piece pin or post, which may be somewhat longer than the diameter of shift rail 20 (and interlock passage 72). In certain embodiments, other configurations may be possible, including various multi-piece configurations. For example, interlock member 74 may include interlock balls 82 and 84, which may be disposed within interlock passage 72 on either side of interlock spring 86. Interlock spring 86 (or another biasing element) may accordingly bias interlock balls 82 and 84 (or other features at ends 74a and 74b of interlock member 74) toward interlock portions 52 and 54, respectively, in order to assist in providing the interlock functionality described above. In this way, for example, as shift fork 22 moves from neutral to engage a gear, interlock portion 52 may urge interlock ball 82 into interlock passage 72, thereby compressing spring 86. This, in turn, may urge interlock ball 84 further into interlock indent 70, thereby preventing shift fork 24 from moving out of neutral. As also noted above, in certain embodiments, spring 86 (or another biasing element or elements) may be selected with appropriate strength to prevent both of interlock balls 82 and 84 (or other features at ends 74a and 74b of interlock member 74) from simultaneously entering interlock passage 72. This may, for example, usefully prevent both of shift forks 22 and 24 from being simultaneously moved out of neutral.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A shift interlock assembly for a transmission configured to shift between at least neutral, a first gear, and a second gear, the shift interlock assembly comprising: a shift rail with at least one interlock passage extending through the shift rail; a first gear engagement device mounted to the shift rail, the first gear engagement device being movable along the shift rail to engage the first gear, the first gear engagement device including a first interlock portion with a first indent, the first indent aligning with a first opening of the at least one interlock passage when the first gear engagement device is in neutral; a second gear engagement device mounted to the shift rail, the second gear engagement device being movable along the shift rail to engage the second gear, the second gear engagement device including a second interlock portion with a second indent, the second indent aligning with a second opening of the at least one interlock passage when the second gear engagement device is in neutral; a single-piece interlock pin having a length greater than the at least one interlock passage and less than a longest distance between the first and second indents, the interlock pin being contained, at least in part, within the at least one interlock passage, a first end of the interlock pin extending out of the first opening of the at least one interlock passage and into the first indent when the first gear engagement device is in neutral, and a second end of the at interlock pin extending out of the second opening of the at least one interlock passage and into the second indent when the second gear engagement device is in neutral; wherein, with both gear engagement devices in neutral, the first end of the interlock pin is spaced from the first indent, and the second end of the interlock pin is spaced from the second indent; wherein, with both gear engagement devices in neutral, as the first gear engagement device moves along the shift rail to engage the first gear, the first interlock portion urges the first end of the interlock pin out of the first indent, the second end of the interlock pin being thereby urged into the second indent to prevent the second gear engagement device from moving out of neutral; and wherein, with both gear engagement devices in neutral, as the second gear engagement device moves along the shift rail to engage the second gear, the second interlock portion urges the second end of the interlock pin out of the second indent, the first end of the interlock pin being thereby urged into the first indent to prevent the first gear engagement device from moving out of neutral.

2. The shift interlock assembly of claim 1, wherein, with the first gear engagement device engaging the first gear and the second gear engagement device in neutral, as the first gear engagement device moves along the shift rail to neutral, the first indent is realigned with the first opening of the at least one interlock passage, the first end of the interlock pin being thereby permitted to move into the first indent, and the second end of the interlock pin being thereby permitted to move out of the second indent; and wherein, with the second gear engagement device engaging the second gear and the first gear engagement device in neutral, as the second gear engagement device moves along the shift rail to neutral, the second indent is realigned with the second opening of the at least one interlock passage, the second end of the interlock pin being thereby permitted to move into the second indent, and the first end of the interlock pin being thereby permitted to move out of the first indent.

3. The shift interlock assembly of claim 1, wherein at least one of the first interlock portion and the second interlock portion includes a partial cylinder partially surrounding the shift rail.

4. The shift interlock assembly of claim 3, wherein the partial cylinder of the at least one of the first interlock portion and the second interlock portion includes a half cylinder.

5. The shift interlock assembly of claim 1, wherein the first interlock portion and the second interlock portion overlap with each other, at least in part, along the shift rail.

6. The shift interlock assembly of claim 1, wherein the at least one interlock passage includes a cylindrical passage extending through a centerline of the shift rail.

7. A shift interlock assembly for a transmission configured to shift between at least neutral, a first gear, and a second gear, the shift interlock assembly comprising: a shift rail with at least one interlock passage extending through the shift rail; a first shift fork slidably attached to the shift rail, the first shift fork including a first interlock portion extending axially along the shift rail, the first interlock portion including a first indent proximate to the shift rail, the first indent aligning with a first opening of the at least one interlock passage when the first shift fork is in neutral; a second shift fork slidably attached to the shift rail, the second shift fork including a second interlock portion extending axially along the shift rail, the second interlock portion including a second indent proximate to the shift rail, the second indent aligning with a second opening of the at least one interlock passage when the second shift fork is in neutral; single-piece interlock pin having a length greater than the at least one interlock passage and less than a longest distance between the first and second indents, the interlock pin being contained, at least in part, within the at least one interlock passage, a first end of the interlock pin extending out of the first opening and into the first indent when the first shift fork is in neutral, and a second end of the interlock pin extending out of the second opening and into the second indent when the second shift fork is in neutral; wherein, with both gear engagement devices in neutral, the first end of the interlock pin is spaced from the first indent, and the second end of the interlock pin is spaced from the second indent; wherein, with both shift forks in neutral, as the first shift fork slides axially along the shift rail to engage the first gear, the first indent moves out of alignment with the first opening of the at least one interlock passage, the first end of the interlock pin being thereby urged into the at least one interlock passage, the second end of the interlock pin being thereby urged farther into the second indent to prevent the second shift fork from sliding axially along the shift rail; and wherein, with both shift forks in neutral, as the second shift fork slides axially along the shift rail to engage the second gear, the second indent moves out of alignment with the second opening of the at least one interlock passage, the second end of the interlock pin being thereby urged into the second opening, the first end of the interlock pin being thereby urged farther into the first indent to prevent the first shift fork from sliding axially along the shift rail.

8. The shift interlock assembly of claim 7, wherein, with the first shift fork engaging the first gear and the second shift fork in neutral, as the first shift fork slides axially along the shift rail to neutral, the first indent is realigned with the first opening of the at least one interlock passage, the first end of the interlock pin being thereby permitted to move into the first indent, and the second end of the interlock pin being thereby permitted to move out of the second indent to permit the second shift fork to slide axially along the shift rail; and wherein, with the second shift fork engaging the second gear and the first shift fork in neutral, as the second shift fork slides axially along the shift rail to neutral, the second indent is realigned with the second opening of the at least one interlock passage, the second end of the interlock pin being thereby permitted to move into the second indent, and the first end of the interlock pin being thereby permitted to move out of the first indent to permit the first shift fork to slide axially along the shift rail.

9. The shift interlock assembly of claim 7, wherein at least one of the first interlock portion and the second interlock portion includes a partial cylinder partially surrounding the shift rail.

10. The shift interlock assembly of claim 9, wherein the partial cylinder of the at least one of the first interlock portion and the second interlock portion includes a half cylinder.

11. The shift interlock assembly of claim 7, wherein the first interlock portion and the second portion overlap with each other, at least in part, along the shift rail.

12. The shift interlock assembly of claim 7, wherein the at least one interlock passage includes a cylindrical passage extending through a centerline of the shift rail.

13. A transmission for a vehicle, the transmission configured to shift between neutral, a first gear, and a second gear, the transmission comprising: a shift rail with at least one interlock passage extending through the shift rail; a first gear engagement device mounted to the shift rail, the first gear engagement device including a first interlock indent and being movable along the shift rail to engage the first gear; a second gear engagement device mounted to the shift rail, the second gear engagement device including a second interlock indent and being movable along the shift rail to engage the second gear; and single-piece interlock pin having a length greater than the at least one interlock passage and less than a longest distance between the first and second indents, the interlock pin being contained, at least in part, within the at least one interlock passage, a first end of the interlock pin extending into the first interlock indent when the first gear engagement device is in neutral, and a second end of the interlock pin extending into the second interlock indent when the second gear engagement device is in neutral; wherein, with both gear engagement devices in neutral, the first end of the interlock pin is spaced from the first indent, and the second end of the interlock pin is spaced from the second indent; wherein, with both gear engagement devices in neutral, as the first gear engagement device is moved along the shift rail to engage the first gear, the first end of the interlock pin is urged out of the first indent and the second end of the interlock pin is urged into the second indent, the interlock pin thereby preventing the second gear engagement device from moving out of neutral; and wherein, with both gear engagement devices in neutral, as the second gear engagement device is moved along the shift rail to engage the second gear, the second end of the interlock pin is urged out of the second indent and the first end of the interlock pin is urged into the first indent, the interlock pin thereby preventing the second gear engagement device from moving out of neutral.

\* \* \* \* \*